United States Patent Office 3,509,002
Patented Apr. 28, 1970

3,509,002
COLORED REINFORCED LAMINATES
Walter Murray Edwards, Wilmington, Del., and Robert Allen Maginn, Ringwood, N.J., assignors to E. I. du Pont de Nemours and Company, Wilmington, Del., a corporation of Delaware
No Drawing. Continuation-in-part of abandoned application Ser. No. 287,492, June 13, 1963. This application Dec. 20, 1966, Ser. No. 603,157
Int. Cl. B32b 5/02
U.S. Cl. 161—6   9 Claims

ABSTRACT OF THE DISCLOSURE

A laminar construction comprising a lamina of polymethyl methacrylate; a lamina of polyester-styrene, polyester, or polymethyl methacrylate resin containing reinforcing fibers; a colored lamina consisting of cellulose nitrate lacquers, plasticized polyvinyl chloride film or pigmented acrylic lacquer interposed between the polymethyl-methacrylate lamina and lamina of resin containing reinforcing fibers and bonded to the polymethyl methacrylate lamina; and a layer of cellulose nitrate, nylon, ammoniated methyl methacrylate-glycidyl methacrylate copolymers, plasticized polyvinyl butyral polymers, polyvinyl chloride, acrylic lacquer having a low plasticizer content or acrylic sheet which is substantially impermeable to any component in the lamina of resin containing reinforcing fibers, the layer being interposed between and bonded to the lamina of resin containing reinforcing fibers and the colored lamina.

---

This application is a continuation-in-part of my application Ser. No. 287,492, filed June 13, 1963, now abandoned.

This invention relates to laminar constructions in which an acrylic layer such as polymethyl methacrylate is reinforced with a reinforcing layer such as polymethyl methacrylate or polyester containing a fibrous reinforcing material. More specifically, this invention relates to laminar constructions in which polymethyl methacrylate is coated on the surface adjacent the reinforcing layer with a color containing composition so as to enhance the beauty and utility of the laminar construction. In particular, this invention relates to laminar construction in which the polymethyl methacrylate layer is separated from the reinforcing layer by a coating or coatings that lend color and stability to the polymethyl methacrylate lamina.

It is known in the art to produce laminar constructions using polymethyl methacrylate lamina, reinforced with glass fiber mats bonded with polymeric resin material. See British Patent No. 904,763, published Aug. 29, 1962 to Moeller. Such laminar constructions are very useful; however, when it is attempted to paint the surface of the polymethyl methacrylate lamina prior to applying the reinforcing material, several problems arise. Specifically, when the surface of the polymethyl methacrylate is painted and then polymerizable polyester containing reinforcing material is applied to that surface, undesired effects, such as stress-solvent crazing, paint distortion, and/or blistering occur.

It is an object of the present invention to provide a laminar construction in which polymethyl methacrylate may be painted or otherwise decorated and its painted surface laminated to a layer of reinforcing material with good bond strength, and with no crazing or other defects. It is a further object of this invention to provide a laminar construction in which the reinforcing layer comprises polyester or polymethyl methacrylate. A further object of this invention is to provide a method of producing a laminar construction having a lamina of polymethyl methacrylate, a colored lamina, and a lamina of reinforcing resin.

The above objects are accomplished according to the present invention by employing a color containing layer that will bond to the polymethyl methacrylate lamina and also bond to the reinforcing resin layer, and that is impermeable to any of the chemical compounds of the reinforcing resin layer, or by employing in combination with a color containing layer that will bond to the polymethyl methacrylate lamina, an additional lamina that will bond to the color containing layer and the reinforcing resin layer and form a barrier that is impermeable to any of the chemical components of the reinforcing layer, especially components that may be present in the uncured or partially cured reinforcing layer, such as monomer.

Although the exact theoretical basis for this invention is not understood, it is believed that components present in the reinforcing layer, such as monomer, are absorbed by the polymethyl methacrylate layer and, in the absence of a layer between these two layers, the rate of absorption is such that polymethyl methacrylate is softened and will yield without stressing as the reinforcing layer cures and shrinks. However, when a colored layer is interposed between the acrylic layer and the reinforcing layer, this layer slows down the rate of absorption so that the acrylic layer does not soften at a rate sufficiently fast to yield without stressing. When compounds are absorbed by the stressed acrylic layer, stress-solvent crazing results. By interposing a layer that will not allow the components from the reinforcing resin layer to come in contact with and be absorbed by the polymethyl methacrylate, crazing of the polymethyl methacrylate is avoided, for polymethyl methacrylate in the absence of some softening agent is sufficiently strong to withstand the curing forces of the reinforcing resin lamina without crazing.

It has been discovered that cellulose nitrate lacquers and modified polymethyl methacrylate lacquers bond to the surface of the polymethyl methacrylate, and that if the lacquer is coated with a barrier layer, the chemical compounds of the reinforcing layer do not penetrate to and become absorbed by the polymethyl methacrylate. Also, pigment or dye may be mixed with a barrier coating material and the two materials applied as a single layer to the surface of the polymethyl methacrylate lamina. Cellulose nitrate lacquers and modified polymethyl methacrylate lacquers are well known in the art, particularly in the automotive industry. Cellulose nitrate lacquers are known to contain pigment, cellulose nitrate and a combination of solvents such as esters, ketones and alcohols. Modified polymethyl methacrylate lacquers are known to be copolymers of polymethyl methacrylate, pigment and a combination of solvents such as esters, ketones and alcohols. Modified polymethyl methacrylate lacquers are described in U.S. Patent No. 2,949,445, issued Aug. 16, 1960 to J. Blake.

The barrier layer should be substantially impermeable to any component in the reinforcing layer that is a solvent for polymethyl methacrylate or the colored layer. The requirement of the barrier layer will, of course, vary with the composition of the reinforcing layer. When the reinforcing layer is a polyester-styrene mixture, suitable barrier materials are cellulose nitrate, nylon copolymers, ammoniated methyl methacrylate-glycidyl methacrylate copolymers, plasticized polyvinyl butyral polymers, and the like. When the reinforcing layer contains polymethyl methacrylate, suitable barrier materials are polyvinyl chloride, acrylic lacquer having a low plasticizer content and acrylic sheets spaced from the surface sheet and combinations of these layers. The barrier layer must adhere to the layers contiguous to it.

The reinforcing layer may be any one of many well known plastic materials. Polyesters obtained by the reaction of maleic acid, propylene glycol and phthalic anhydride, are highly satisfactory. Also polymer-in-monomer solutions of polymethyl methacrylate dissolved in methyl methacrylate monomer, as described in British Patent 870,191, issued to Calkins et al. on Oct. 4, 1961, are highly useful.

The reinforcing resin should contain from 10 to 80% by weight fibrous material. Various fibers, such as glass, sisal, hemp, asbestos, nylon, propylene, acrylic fibers made from acrylonitrile, are highly satisfactory.

A suitable method for the application of the reinforcing layer is a roving gun having a dual head and a chopper. Such a system is more fully described in U.S. patent application Ser. No. 278,231, filed May 6, 1963 by Robert Allen Maginn, abandoned Mar. 16, 1966. The reinforcing layer may also be applied as a matt or batt that has been impregnated with polymerizable resin.

In most instances the polymethyl methacrylate film will be between 5 and 125 mil, the colored lamina between 1 and 5 mil, the barrier layer between 1 and 10 mil, and the reinforcing layer between 10 and 200 mil.

In the following examples all parts and percentages are in parts by weight unless otherwise specified.

EXAMPLE I

A 40 mil extruded sheet of polymethyl methacrylate was heated by infra-red lamps until it was soft and pliable. The sheet was molded by vacuum forming on a mold which had the shape of an automobile fender. The molded sheet was cooled and painted on the surface that had been next to the mold, with a commercially available cellulose nitrate lacquer, comprising titanium dioxide pigment, cellulose nitrate, methyl ethyl ketone, and methyl alcohol. After drying, this layer was about 1 mil thick. The lacquer film was then sprayed with a nylon coating composition, consisting essentially of 8 parts of a copolymer produced by the method set forth in Example III of U.S. Patent 2,467,186, issued Apr. 12, 1949 to T. Cairns, which copolymer contains 35.5 parts hexamethylene diammonium adipate, 26.5 parts hexamethylene diammonium sebacate, and 38 parts caprolactam, and 2 parts of the epoxy monomer resulting from the reaction of epichlorohydrin and bisphenol A, dissolved in 45 parts methanol and 45 parts trichloroethylene. This film was dried and formed a tough layer 3 mil thick. The reinforcing layer was then applied using a dual head roving gun having a chopper. Glass fibers and a polyester made by reacting maleic acid (2 parts), propylene glycol (1 part), and phthalic anhydride (1 part) at 300° F. for 8 hours, and then mixed with styrene monomer in a ratio of 70 parts polyester to 30 parts styrene, were applied. One head of the dual head roving gun fed the polyester resin containing methyl ethyl ketone peroxide in the amount of 2% by weight, and the other head fed polyester resin containing cobalt naphthenate in the amount of .5% by weight. The chopper was fed with a continuous glass roving (60 strands per fiber and 204 filaments per strand—each filament had a diameter of 0.00035 inch) which it cut into 2-inch lengths. The feed of glass roving was regulated so that about 30% by weight of the reinforcing layer was glass fiber. The air was removed from the reinforcing layer by compression rolling and the reinforcing layer allowed to cure at room temperature for 8 hours. The resulting laminate was completely free of crazing and readily withstood heavy blows with a hammer.

EXAMPLE II

A molded sheet made by the process of Example I was painted on one surface with a modified methyl methacrylate lacquer containing pigment produced in accordance with U.S. Patent No. 2,949,445 issued Aug. 16, 1960 to J. Blake. The lacquer film was dried and had a thickness of about 1.5 mil. The lacquer film was then coated with a barrier layer formed by charging into a reaction vessel and heating under a nitrogen blanket at 85 to 90° C. for six hours the following:

| | Parts |
|---|---|
| Methyl methacrylate | 40 |
| n-Hexyl methacrylate | 57 |
| Glycidyl methacrylate | 3 |
| Toluene | 33.3 |
| Isopropyl alcohol | 33.3 |
| Alpha, alpha'-azodiisobutyronitrile | 0.2 |

After 6 hours, 0.2 more parts of alpha, alpha'-azodiisobutyronitrile was added to the reaction mixture and the heating continued for 3 more hours. The resulting solution was diluted with 71.7 parts of toluene and 161.7 parts of isopropanol. The solution at this point had a Brooksfield viscosity of 0.65 poises using a No. 1 spindle at 6 r.p.m.

This solution was then charged to an autoclave and pressured with ammonia at 145 pounds per square inch gauge, and heated for 16 hours at 70° C. Ammonia was then stripped from the reaction mixture by reducing the pressure thereon to 100 millimeters of mercury and holding the mixture at 40° C. at that pressure for 5 hours. The resulting polymer solution contained about 0.3% of amino nitrogen.

The polymer solution was cut with an equal volume of a 1:1:1 mixture of methyl ethyl ketone, dimethyl ether, methyl alcohol, and sprayed on the dried modified methyl methacrylate lacquer. A 5 mil film was formed.

The 5 mil barrier layer was then coated with reinforcing material by means of a roving gun as described in Example I, but this time a polymer-in-monomer solution of methyl methacrylate (produced by the method set forth in British Patent No. 870,191, issued to Calkins et al. on Oct. 4, 1961) was employed. Both heads of the dual head roving gun sprayed a mixture of polymethyl methacrylate and 0.1 parts per million parts of polymer-in-monomer solution of antimony trichloride—an initiator accelerator. The glass rovings had been previously treated with lauroyl peroxide by passing them through a 10% solution. A 100 mil film of this material was applied, compacted, and cured. The resulting article was uncrazed.

EXAMPLE III

The molding operation of Example I was repeated using a 100 mil sheet. The sheet was directly coated with a nylon copolymer barrier layer such as described in Example I, but this time the barrier layer was pigmented by adding 15 parts titanium dioxide rutile pigment. The copolymer and the pigment were ball milled for 48 hours prior to spraying on the formed sheet.

The nylon copolymer layer was then backed up with a polyester-styrene mixture containing acrylonitrile fibers. The resulting lamina was uncrazed.

EXAMPLE IV

A laminate consisting of two sheets of 0.030 inch thick polymethylmethacrylate sheets and one intermediate layer of commercially available 0.007 inch thick plasticized polyvinyl chloride film having one surface printed with a woodgrain pattern was produced by rolling the film against one polymethylmethacrylate sheet at a pressure of about 80 pounds per inch of roll length while the temperature was held at about 460 to 540° F. The polyvinyl chloride film side of the resulting laminate was then rolled against the second polymethyl methacrylate sheet under about the same temperature and pressure conditions.

This three-component laminate was then thermoformed by heating to about 270° F. and molding with a partial vacuum and then reinforced on the side opposite the woodgrain finish by spraying the surface with a roving gun in the manner set forth in Example I, using a resin mixture of the following composition:

3000 parts methyl methacrylate polymer in monomer solution of methyl methacrylate, having a bulk viscosity (Brookfield method) of about 5 poises, and containing about 30% polymer;
75 parts calcium carbonate powder;
30 parts benzoyl peroxide;
12.0 parts N,N-dimethyl-p-toluidine.

The glass fiber was fed at a rate sufficient to give a reinforcing layer that was about 50% by weight glass fiber. The reinforcing layer was then pressed with a roller to remove voids. The polymer-in-monomer solution in the reinforcing layer was then cured without adding heat, curing time about 1 hour. The reinforcing layer was about 0.050 inch thick and was firmly bonded to the surface of the polymethyl methacrylate sheet.

The three component laminate, i.e. the two polymethyl methacrylate sheets and the inner polyvinyl chloride film, can be made by pressing together the sheets at about 265 pounds per square inch at a temperature of about 300° F. using a hydraulic press.

Instead of using a roving gun to apply the reinforcing layer, the glass cloth or matted fibers may be impregnated with the polymer-in-monomer solution and pressed against the surface to be supported.

EXAMPLE V

A polymethyl methacrylate sheet 0.070 inch thick was spray painted with a commercially available pigmented acrylic lacquer. The lacquer contained about 28.6% by weight benzyl butyl phthalate, percent of the total solids, which served as a plasticizer. The lacquer was dried for 15 minutes at room temperature and further cured by heating in an oven at 170° F. for thirty minutes. The lacquer layer was about 0.001 to 0.002 inch thick.

The pigmented layer was then sprayed with a layer of unpigmented acrylic lacquer containing about 14% by weight benzyl butyl phthalate. This layer was then cured in the same manner as the pigmented layer, and then additional unpigmented lacquer was applied until the layer was at least 0.008 inch thick.

The unpigmented lacquer was then reinforced by applying a glass fiber mat containing the polymer-in-monomer solution described in Example IV. The glass content of the reinforcing layer was about 50% by weight. The reinforcing layer was about 0.190 inch thick.

Laminates prepared by the method of this example may contain different contrasting colors by masking portions of the polymethyl methacrylate sheet when the pigmented acrylic lacquer is applied and then applying a second color to the previously masked portion.

It is important that a layer of low plasticizer content acrylic lacquer be applied to the high plasticizer content acrylic lacquer layer, and that this low plasticizer content layer be at least about 0.008 inch thick, for the low plasticizer content layer serves as a barrier layer.

EXAMPLE VI

A polymethylmethacrylate sheet 0.025 inch thick was spray painted with a pigmented commercially available acrylic lacquer of 30% plasticizer content. A sheet of 0.025 inch thick polymethyl methacrylate was then bonded to the painted surface by heating to 250–270° F. at a pressure of about 100 pounds per square inch in a hydraulic press for one minute.

The resulting composite was then reinforced by the use of a glass mat that had been impregnated with the polymer-in-monomer solution described in Example IV.

The term "polymethyl methacrylate" as used herein includes homopolymers as well as copolymers of methyl methacrylate and other acrylic monomers, such as for example, ethyl acrylate, in which the other acrylic monomer is present to the extent of up to about 35% by weight of the composition. The polymethyl methacrylate may be stabilized with ultraviolet and thermal stabilizers.

The polymethyl methacrylate surface of the laminate may be further treated after lamination to increase its toughness and scratch resistance by methods shown in the art.

We claim:
1. A laminar construction comprising
   (a) a lamina of polymethyl methacrylate,
   (b) a lamina of resin selected from the class consisting of a polyester-styrene, polyester, and polymethyl methacrylate resin, said resin containing between 20 and 60% by weight of a reinforcing fiber selected from the class consisting of glass, asbestos, hemp, sisal, nylon, polypropylene, acrylonitrile, polyester fiber and metal,
   (c) a colored lamina interposed between said lamina of polymethyl methacrylate and said lamina of resin, said colored lamina being selected from the class consisting of cellulose nitrate lacquers, plasticized polyvinyl chloride film, and pigmented acrylic lacquer, said colored lamina being adjacent, bonded to, and visible through said polymethyl methacrylate lamina; and
   (d) a layer of material that is substantially impermeable to any component that may be present in said lamina of resin, said layer being interposed between and bonded to said lamina of resin and said colored lamina, said material being selected from the class consisting of cellulose nitrate, nylon, ammoniated methyl methacrylate-glycidyl methacrylate copolymers, plasticized polyvinyl butyral polymers, polyvinyl chloride, acrylic lacquer having a low plasticizer content, and acrylic sheet.

2. The laminar construction of claim 1 in which the colored lamina is selected from the class consisting of cellulose nitrate lacquers.

3. The laminar construction of claim 2 in which the layer of material that is substantially impermeable to the lamina of resin is nylon.

4. The laminar construction of claim 1 in which the colored lamina is pigmented acrylic lacquer.

5. The laminar construction of claim 4 in which the reinforcing fiber in the lamina of resin is glass fibers, the lamina of resin is polymethyl methacrylate, and the layer of material that is substantially impermeable to any component that may be present in the lamina of resin is acrylic sheet.

6. The laminar construction of claim 4 in which the reinforcing fiber in the lamina of resin is glass fibers, the lamina of resin is polymethyl methacrylate, and the layer of material that is substantially impermeable to any component that may be present in the lamina of resin is an acrylic lacquer having a low plasticizer content and which is at least 0.008 inch thick.

7. The laminar construction of claim 1 in the shape of an automobile body part.

8. The laminar construction of claim 1 in which the colored lamina is plasticized polyvinyl chloride film.

9. The laminar construction of claim 8 in which the reinforcing fiber in the lamina of resin is glass fibers, the lamina of resin is polymethyl methacrylate, and the layer of material that is substantially impermeable to any component that may be present in the lamina of resin is acrylic sheet.

References Cited

UNITED STATES PATENTS

| | | | |
|---|---|---|---|
| 2,782,132 | 2/1957 | Johnson | 117—166 X |
| 2,793,971 | 5/1957 | Collins et al. | 296—31 PX |
| 2,825,672 | 3/1958 | Koblitz et al. | 161—227 X |
| 2,949,383 | 8/1960 | Blake | 117—72 |
| 3,132,065 | 5/1964 | Barsy et al. | 161—256 X |
| 3,135,645 | 6/1964 | Burkley et al. | 161—233 X |
| 3,285,802 | 11/1966 | Smith et al. | |

ROBERT F. BURNETT, Primary Examiner

L. M. CARLIN, Assistant Examiner

U.S. Cl. X.R.

161—203, 227, 231, 247, 252; 296—31